United States Patent [19]

Tamasi et al.

[11] Patent Number: 4,589,273
[45] Date of Patent: May 20, 1986

[54] METHOD OF TESTING SHOCK ABSORPTION OF A SPRING RUNNING GEAR, PARTICULARLY UNDERCARRIAGE OF A ROAD MOTOR VEHICLE WITH ELASTIC TIRES AND APPARATUS FOR PERFORMING THE METHOD

[75] Inventors: Attila Tamasi; Mihály Kardos; László Faragó, all of Budapest, Hungary

[73] Assignee: "Transinnov" Kozlekedesi Muszaki Fejleszto Leanyvallalat, Budapest, Hungary

[21] Appl. No.: 671,448

[22] Filed: Nov. 14, 1984

[30] Foreign Application Priority Data

Nov. 14, 1983 [HU] Hungary .............................. 3885/83

[51] Int. Cl.$^4$ .......................................... G01M 17/04
[52] U.S. Cl. ........................................................ 73/11
[58] Field of Search ................... 73/11, 662, 663, 666, 73/667, 669, 670

[56] References Cited

U.S. PATENT DOCUMENTS

| 3,282,088 | 11/1966 | Joannou | 73/667 X |
| 3,855,841 | 12/1974 | Hunter | 73/11 |
| 3,902,352 | 9/1975 | Buzzi | 73/11 |
| 3,937,058 | 2/1976 | Hilbrands | 73/11 |
| 3,981,174 | 9/1976 | Himmler | 73/11 |
| 4,002,051 | 1/1977 | Hilbrands | 73/11 |
| 4,103,532 | 8/1978 | Buzzi | 73/11 |

FOREIGN PATENT DOCUMENTS 0049303  4/1982  European Pat. Off. .................. 11/

Primary Examiner—Charles A. Ruehl
Attorney, Agent, or Firm—Young & Thompson

[57] ABSTRACT

A method and apparatus for testing the shock absorption of a spring running gear, particularly the undercarriage of a road motor vehicle with elastic tires by having the wheels jounced through the natural frequency and measuring the minimum wheel load at the maximum frequency and the natural frequency during the downward travel of the running gear, forming a ratio from the values of the measured wheel loads and qualifying the damping of the running gear depending on this ratio. The method is practiced by an apparatus having a support plate through intermediate means, and a force sensing unit connected to an electronical measuring unit and to the intermediate means, wherein the energizing means is provided with wedging means driven horizontally by a crank mechanism and mounted on the support plate on the one hand and on the intermediate means formed as a two-support beam on the other hand. One of the supports of the two-support beam is constituted by the force sensing unit. (FIG. 2).

6 Claims, 3 Drawing Figures

METHOD OF TESTING SHOCK ABSORPTION OF A SPRING RUNNING GEAR, PARTICULARLY UNDERCARRIAGE OF A ROAD MOTOR VEHICLE WITH ELASTIC TIRES AND APPARATUS FOR PERFORMING THE METHOD

BACKGROUND OF THE INVENTION

This invention relates to a method for determining the condition of the effectiveness of shock absorption of a spring running gear, particularly undercarriage of a road motor vehicle with elastic tires and to an apparatus for carrying the method into practice.

The importance of testing of shock absorbers while installed in a vehicle running gear (suspension) system from the point of traffic safety is presently known. For solving of said task several solutions are developed, which all have a common feature that they are based on measurement of the number of oscillations of the car body or the damping of the wheel oscillation. Accordingly, an oscillation of the car body or the wheels is generated and the displacements meanwhile are registered. The magnitude of the oscillations of the car body has an influence on the comfort of the passengers, the evaluation of this magnitude yields no satisfying result according to the observations for the condition of effectiveness of shock absorbers in the vehicle with a view of traffic safety.

An apparatus for testing of built-in shock absorbers is known as well, in which a drive motor swings a support plate through an eccentric and a spring and the wheels of the running gear to be tested are placed on the support plate. During testing the energizing frequency is increased a little bit over the natural frequency of the running gear, then the energizing frequency is slowly decreased by switching off the power. The energizing frequency passes through the natural frequency of the running gear in this retardation cycle and the displacements of the support plate are registered during the running out. (Such a test apparatus is, for example of the German company "BOGE", well known.)

The shortcomings of the above mentioned solution lie in that the condition of the tested system does not meet the requirements of the real traffic conditions because the natural frequency of the apparatus depends on the rigidity of the springs of the test stand, the mass of the support plate, the unsprung mass of the running gear (undercarriage) and the spring of the car body, as well. Thereupon, the oscillating system will be mistuned and the measured value of the resonant amplitude and the behavior of the shock absorbers with a view of traffic safety can be made only by correlation with much circumstance. A necessary conditon of it is the full knowledge of the limiting values which depend on the production of the shock absorbers and vehicles. This makes the operation of the apparatus extremely difficult in case of heterogeneous vehicle fleets and set for the operator a tedious task.

For approximation of the real traffic conditions and for general purpose of the qualification the Hungarian patent specification No. 176.823 describes a solution comprising the steps of sensing the changes of the wheel load during the speed-up and slowing down cycles produced by the energizing frequency, determining the average wheel load by electrical process, comparing the minimum wheel load occurring at the natural frequency of the running gear in the slowing down cycle to the average value of the wheel load and qualifying the shock absorbers. The apparatus for performing said method is provided with a support plate and co-operating energizing means connected to said support plate through a double-arm lever, wherein the fulcrum of the lever is joined with a force sensing unit. The force sensing unit is connected to an electronical measuring unit.

In the above solution a ratio is formed by division of the average wheel load by the minimum wheel load occurring at the natural frequency of the running gear and the quality of the shock absorber is displayed in percentage, but a major share of the full quality range remains unused. An oscillation of the wheel load in some degree is always generated by the energizing amplitude and the rubber rigidity, so that a seventy-five--eighty percent quality results in the case of the theoretically attainable upper limit.

SUMMARY OF THE INVENTION

The task of the present invention is to further develop the above-mentioned solution and to provide a method and apparatus for testing of shock absorption of a motor vehicle in which the full quality range can be used inclusive of the theoretically upper limit (100%).

This task is solved (based upon the Hungarian patent specification No. 176.823) according to the invention in the manner that the minimum wheel load is measured approximately at the maximum frequency and a ratio is formed from the minimum wheel load measured at the natural frequency of the running gear and from the minimum wheel load measured at the maximum frequency and the shock absorption of the running gear is qualified depending on the ratio value.

Preferably the maximum frequency is chosen one and a half times higher than the natural frequency of the running gear.

It is another object of this invention to provide an apparatus for performing the method.

The apparatus according to the present invention is of the type having a support plate constituting a wheel supporting surface, energizing means co-operating with the support plate through intermediate means, further a force sensing unit connected to an electrical measuring unit and being in connection with the intermediate means. The essence of the apparatus is that the energizing unit is provided with wedging means driven by a crank mechanism and mounted on the upper operating surfaces formed on the bottom of the support plate on the one hand and on the lower operating surfaces of the intermediate means formed as a two-support beam on the other hand. The upper and/or lower ones of the operating surfaces include a bevel to the horizontal and one of the supports of the two-support beam is constituted by the force sensing unit.

The wedging means of the apparatus according to the invention are preferably mounted on needle-roller bearings.

Preferably another support of the two-support beam is formed as a suspension joint, around of which the two-support beam can be tilted up.

In a preferred embodiment of the apparatus the electronical measuring unit forms a measuring/evaluating unit having a pre-amplifier connected to the force sensing unit, a d.c. amplifier/integrator and an a.c. amplifier connected in shunt to the output of the pre-amplifier, the d.c. amplifier/integrator, an adder, a divider and a digital voltmeter are connected in series, while the a.c. amplifier, a peak rectifier and a further adder are also connected in series. The output of the peak rectifier is connected to a sample-and-hold amplifier as well, the output of which is connected to another input of the adder. The peak rectifier is bidirectionally connected to a unit for automatic erasing, controlling and side selecting. An output of this unit is connected to a motor switch and another output of the unit is connected to a generator which generates sampling impulses and an output of this generator is connected to a further input of the sample-and-hold amplifier. The adder has an output connected to a second input of the divider and a further input connected to the output of the d.c. amplifier. An output of the digital voltmeter is connected to a digital read-out and/or a digital interface.

These and other objects will become more apparent after referring to the following specification and drawings.

BRIEF DESCRIPTION OF THE DRAWINGS

The currently preferred embodiment of the invention is shown in the accompanying drawings, wherein.

DETAILED DESCRIPTION OF THE PREFERRED EMBODIMENT

Figure 1:
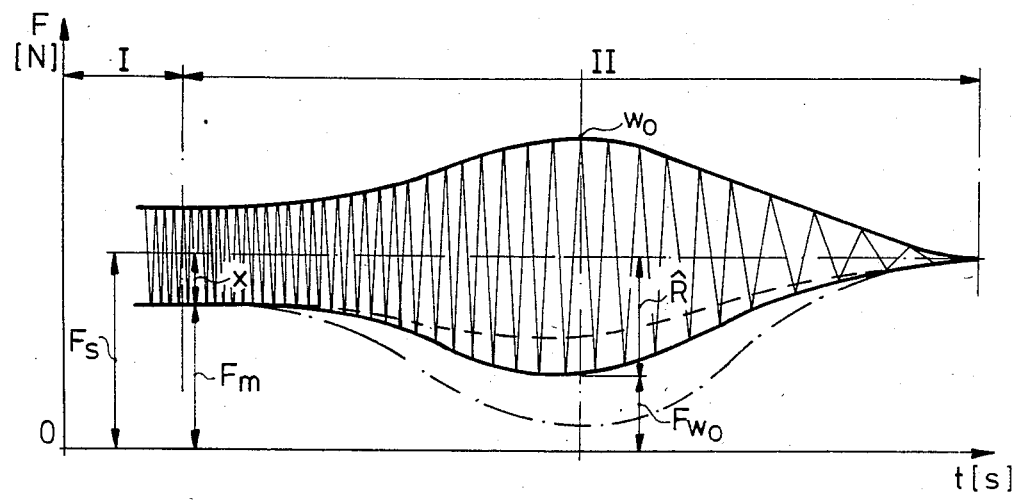
FIG. 1 shows a diagram of the change of the wheel load.

As shown in FIG. 1, on the graph of the change of wheel load is shown on the Y-axis (in Newtons) and the time is shown on the X-axis (in seconds). Referring to FIG. 1, reference numeral "I" is a speed-up cycle, "II" is a slowing down cycle, $\omega$ is the natural frequency of the running gear, $F_\omega$ is a minimum wheel load at the natural frequency, $F_m$ is a minimum wheel load at the maximum frequency and $F_s$ is an average value of the wheel load. A medium damping is marked by thick full line, a heavy damping is marked by thin dashed line and thin dot line shows weak damping. The value of the minimum wheel load at the maximum frequency is extended to the point of the natural frequency of the running gear by a thin full line. This means the theoretically maximum damping, i.e. the 100% quality of the shock absorber.

In the course of our experience we have set the maximum energizing frequency between 15 and 25 Hz, the period of the speed-up cycle "I" for 2 sec, the period of the slowing down cycle "II" for 20 sec, e.g. the maximum energizing frequency is chosen a little bit higher than one and a half times the natural frequency $\omega$ of the tested running gear. (It is to be noted that the natural frequency of motor cars lies between 12 and 15 Hz while that of motor trucks lies about at 10 Hz).

According to the invention the minimum wheel load $F_m$ is measured at the maximum frequency and the minimum wheel load $F_\omega$ is measured at the natural frequency $\omega$ of the running gear. Both values are then compared and a ratio k can be formed according to the formula:

$$k = F_\omega / F_m \cdot 100\%$$

and depending on this ratio the damping of the running gear oscillation can be qualified.

It is to be pointed out that the damping (shock absorption) of the running gear can be determined by the above and not the damping of the shock absorber only. The self-damping of the tires, the springs and the damping of friction character of the suspension means have an effect on the damping of the running gear oscillation as well. (It is to be noted that e.g. the interplate friction of a flat-plate spring assembly can improve the damping in given cases.)

Figure 2:
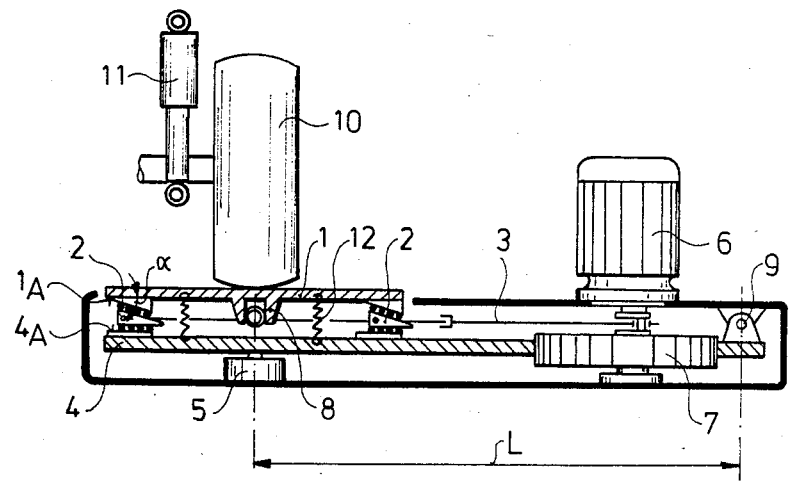
FIG. 2 is a sectional elevational view of one embodiment of the apparatus for carrying the method according to the invention into practice.

FIG. 2 shows a sectional elevational view of a preferred embodiment according to the invention without the electronical measuring/evaluating unit and the display units. As shown, the apparatus has a support plate 1 constituting a wheel supporting surface and energizing means co-operated with the support plate through intermediate means. The energizing means includes a crank mechanism 3 driven by a motor 6 and a flywheel 7 mounted on a crankshaft of the crank mechanism 3. The crank mechanism 3 is connected to wedging means 2 movable in a horizontal plane. The wedging means 2 are mounted on the operating surfaces $1_A$ formed on the bottom of the support plate 1 by their upper surfaces and on the operating surface $4_A$ of the intermediate means formed as a two-support beam 4 by their lower surfaces. In the present case the operating surfaces $1_A$ of the support plate 1 include a bevel $\alpha$ to the horizontal and the wedging means 2 are mounted on known needle-roller bearings by their upper and lower surfaces. One of the supports of the two-support beam 4 is constituted by a force sensing unit 5 developed as electric transducer, which enables the force measuring without any displacement practically, by means of an electronical measuring/evaluating unit described below.

The flywheel 7 of the energizing means is designed to ensure the constant frequency drop. The bearing of the wedging means 2 in needle-roller bearings means a negligible frictional resistance. The support plate 1 is provided with means 8 for vertical guiding. The other of the supports of the two-support beam 4 is performed with a suspension joint 9, around which the beam 4 can be tilted up, e.g. for assembling. The support plate 1 is connected to the two-support beam 4 over tension springs 12. Reference number 10 is given to the vehicle tire and reference number 11 is given to the shock absorber of the vehicle. In this preferred case the distance between the joint 9 and central line of the force sensing unit 5 is determined at 0.8 m (2.625 feet). In consequence of this relatively great spacing and the suspension joint 9 the effect of horizontal forces can fully be eliminated.

Figure 3:
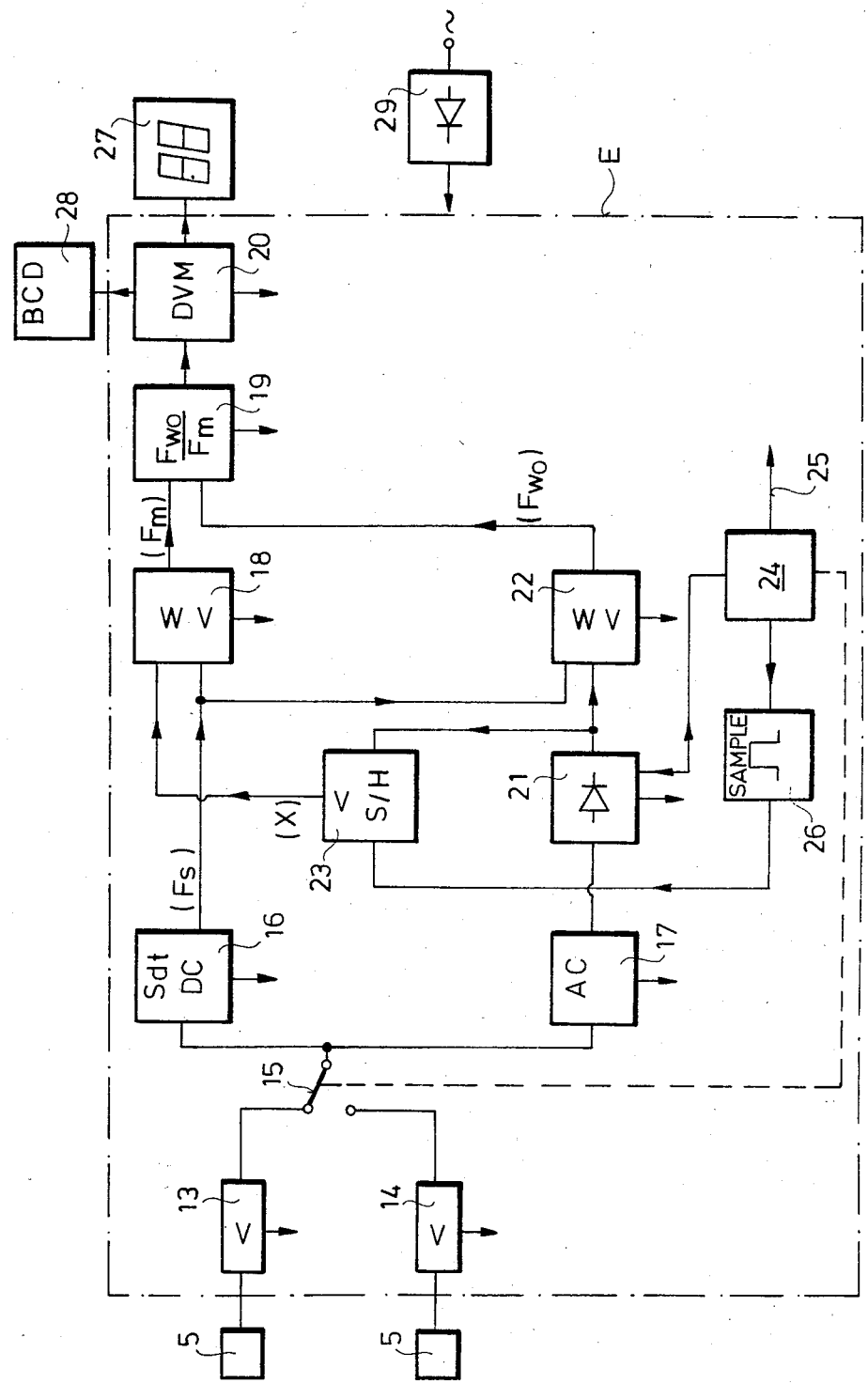
FIG. 3 is an electrical block diagram of the electronical measuring/evaluating unit of the apparatus of FIG. 2.

FIG. 3 shows an electrical block diagram of the electronical measuring/evaluating unit "E" of the apparatus described above. There are indicated separate right hand—force sensing unit 5 and left hand—force sensing unit 5 connected to each pre-amplifier 13, 14 respectively. Outputs of the pre-amplifiers 13 and 14 are connected to an SPDT switch 15. Pre-amplifiers 13 and 14 amplify the relatively small output voltage of the force sensing units 5 from 2 mV in about 0.5 V. A d.c. amplifier/integrator 16 and an a.c. amplifier 17 are connected in shunt to the switch 15. To the d.c. amplifier/integrator 16 an adder 18, a divider 19 and a digital voltmeter 20 are connected in series. To the a.c. amplifier 17 a peak rectifier 21 and further adder 22 are connected in series. An output of the peak rectifier 21 is connected to a sample-and-hold amplifier 23 as well, an output of which is connected to another input of the adder 18. The peak rectifier 21 has a second input connected to a unit 24 for automatic erasing, controlling and side selecting. One of the outputs of the unit 24 is connected to a motor switch (symbolized by an arrow 25), another output of the unit 24 is connected to a generator 26 for generating of sampling impulses. An output of the generator 26 is connected to a further input of the sample-and-hold amplifier 23. The adder 22 has an output connected to another input of the divider 19 and a further input connected to the output of the d.c. amplifier/integrator 16. An output of the digital voltmeter 20 is connected to a digital readout 27 and a digital interface 28, respectively to drive a line printer (not shown). The latter two means do not belong to the electronical measuring/evaluating unit "E" essentially.

Similarly, a power supply 29 does not form a part of the electronical measuring/evaluating unit "E". However, it is connected to the means of the unit "E" provided with an arrow looking downwards.

The d.c. amplifier/integrator 16 makes amplifying of 1 to 10 and developing of the average value. The a.c. amplifier 17 makes amplifying of 1 to 10 of the a.c. signals for the peak rectifier 21. The peak rectifier 21 measures and stores the peak values of the a.c. signals. Adder 18 substracts a stored signal x of the amplifier 23 from the signals $F_s$ of the d.c. amplifier/integrator 16 and the value $F_m$ remains (shown in FIG. 1). The task of the generator 26 is to provide a TTL impulse with a length of 0.5 sec after the motor 6 is switched off.

The sample-and-hold amplifier 23 samples the output signal of the peak rectifier 21 during the period of the impulse of the generator 26 and holds it until measuring.

The divider 19 divides $F_\omega$ by $F_m$ and transmits the result to the digital voltmeter 20.

The digital voltmeter 20 converts the analogue signals of the divider 19 to digital signals and controls the readout. (During the measuring the display shows 00, and after 20 sec the value of the quality in percent, e.g. 62%).

The digital readout 27 and the digital interface 28 driving the line printer and the stabilized power supply 29 are well known in themselves.

The unit 24 for automatic erasing, controlling and side selecting drives and controls the time shifted measurements, ensures time delay, starts impulse for the sampling and holding and brings the switch 15 into connection with the force sensing unit 5 on the left and on the right, respectively.

The main advantage of the solutions according to the invention lies in that the full quality range can be used e.g. theoretically maximum damping of 100% can be reached. Furthermore, the apparatus can be used in the case of a heterogeneous vehicle fleet as well, by a simple, cheap and safe construction.

We claim:

1. A method of testing shock absorption of a spring running gear, particularly undercarriage of a road motor vehicle with elastic tires comprising the steps of:
   jouncing a wheel of said spring running gear upward through its natural frequency ($\omega$) by an energizing frequency of constant amplitude;
   measuring a minimum wheel load ($F_m$) at about a maximum frequency;
   slowing down the oscillating of said wheel by reducing of the energizing frequency while measuring a minimum wheel load ($F_\omega$) at the natural frequency ($\omega$) of the running gear;
   forming a ratio (k) from the minimum wheel load ($F_\omega$) at the natural frequency ($\omega$) and the minimum wheel load ($F_m$) at the maximum frequency according to the formula: $k = F_\omega/F_m \cdot 100\%$; and
   qualifying the damping of said running gear depending on the value of the ratio (k).

2. A method according to claim 1, wherein the maximum energizing frequency is chosen at least one and a half times higher than the natural frequency ($\omega$) of the running gear.

3. Apparatus for testing of shock absorption of a spring running gear, particularly undercarriage of a road motor vehicle with elastic tires comprising:
   a support plate constituting a wheel supporting surface;
   energizing means connected to said support plate through intermediate means;
   at least one force sensing unit connected to an electronic measuring unit and to the intermediate means, wherein the energizing means is provided with wedging means (2) driven by a crank mechanism (3) and mounted between upper operating surfaces ($1_A$) formed on the bottom of the support plate (1) and lower operating surfaces ($4_A$) formed on the intermediate means developed as a two-support beam (4), and the upper and/or lower of the operating surfaces ($1_A$, $4_A$ resp.) include a bevel ($\alpha$) to the horizontal, and one of the supports of the two-support beam (4) is constituted by the at least one force sensing unit (5).

4. Apparatus according to claim 3, wherein the wedging means (2) are mounted on needle-roller bearings.

5. Apparatus according to claim 3, wherein the other support of the two-support beam (4) is formed as a suspension joint (9) around which the two-support beam (4) can be tilted up.

6. Apparatus according to claim 3, wherein said at least one force sensing unit is a first and second force sensing units, said electronic measuring unit is formed as a measuring/evaluating unit (E) having two pre-amplifiers (13, 14), one said pre-amplifier being connected to said first force sensing unit and the other said pre-amplifier being connected to said second force sensing unit (5), the output of each pre-amplifier (13 and 14 resp.) is connected in shunt to an input of a d.c. amplifier/integrator (16) and an input of an a.c. amplifier (17) through a side selector switch (15), the d.c. amplifier/integrator (16), an adder (18), a divider (19) and a digital voltmeter (20) are connected in series, the a.c. amplifier (17), a peak rectifier (21) and a further adder (22) are connected in series as well, an output of the peak rectifier (21) is also connected to an input of a sample-and-hold amplifier (23), an output of which is connected to another input of the adder (18), the peak rectifier (21) is bidirectionally connected to a unit (24) for automatic erasing, controlling and side selecting and one output of the unit (24) is connected to a motor switch (25) and a second output of the unit (24) is connected to a generator (26) which generates sampling impulses, the generator (26) has an output connected to another input of the sample-and-hold amplifier (23), further an output of the adder 22 is connected to a further input of the divider (19) and another input of the adder (22) is connected to the output of the d.c. amplifier/integrator (16) and an output of the digital voltmeter (20) is connected to a digital readout (27) and a digital interface (28), respectively to drive a digital printer.

* * * * *